(12) United States Patent  (10) Patent No.: US 8,981,302 B2
Yang et al.  (45) Date of Patent: Mar. 17, 2015

(54) INFRARED SENSORS FOR ELECTRONIC DEVICES

(71) Applicant: Apple Inc., Cupertino, CA (US)

(72) Inventors: Henry H. Yang, Los Gatos, CA (US); Matthew E. Last, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 62 days.

(21) Appl. No.: 13/740,081

(22) Filed: Jan. 11, 2013

(65) Prior Publication Data

US 2014/0197317 A1  Jul. 17, 2014

(51) Int. Cl.
*G01J 5/10* (2006.01)
*G06F 1/32* (2006.01)
*H04M 1/32* (2006.01)
*H04M 1/725* (2006.01)
*G06F 1/16* (2006.01)
*H04M 1/22* (2006.01)

(52) U.S. Cl.
CPC ............ *G06F 1/3265* (2013.01); *G06F 1/3231* (2013.01); *H04M 1/22* (2013.01); *H04M 1/32* (2013.01); *H04M 1/72577* (2013.01); *H04M 2250/12* (2013.01); *H04M 2250/22* (2013.01); *G06F 1/1684* (2013.01)
USPC ...................... 250/341.8; 250/338.1; 250/349

(58) Field of Classification Search
CPC .......... G06F 3/017; G06F 3/011; H05B 37/02
USPC ..................................................... 250/341.8
See application file for complete search history.

(56) References Cited

U.S. PATENT DOCUMENTS

| | | | |
|---|---|---|---|
| 6,107,938 A * | 8/2000 | Du et al. | 340/12.22 |
| 6,300,632 B1 * | 10/2001 | Liu et al. | 250/338.4 |
| 7,714,265 B2 | 5/2010 | Fadell et al. | |
| 7,960,699 B2 | 6/2011 | Chang et al. | |
| 2011/0117955 A1 | 5/2011 | Lee et al. | |
| 2011/0210253 A1 * | 9/2011 | Micko | 250/349 |
| 2011/0291918 A1 * | 12/2011 | Surber et al. | 345/8 |

FOREIGN PATENT DOCUMENTS

WO  2011129983  10/2011

OTHER PUBLICATIONS

"Fully Integrated Proximity and Ambient Light Sensor with Infrared Emitter and I2C Interface", Document No. 83798, Vishay Semiconductors, May 10, 2012 (13 pages).

* cited by examiner

*Primary Examiner* — Marcus Taningco
(74) *Attorney, Agent, or Firm* — Treyz Law Group; G. Victor Treyz; Kendall P. Woodruff

(57) ABSTRACT

An electronic device may be provided with proximity sensor capabilities for monitoring for the presence of nearby external objects. The electronic device may make temperature measurements such as measurements involving the monitoring of nearby objects for emitted blackbody light indicative of whether or not the external object is a heat-emitting object such as a human body part. The same sensor that is used in gathering temperature readings may be used in gathering proximity sensor data or separate temperature sensor and proximity sensor detector structures may be used. Motion sensor capabilities may be provided using sensor structures having an array of heat sensing elements. Signals from the array of heat sensing elements may be used in making temperature measurements and in gathering proximity sensor readings. Sensor structures may operate at wavelengths longer than 3 microns such as wavelengths from 3-5 microns or 10-15 microns.

19 Claims, 6 Drawing Sheets

INFRARED SENSORS FOR ELECTRONIC DEVICES

BACKGROUND

This relates generally to electronic devices and, more particularly, to electronic devices with infrared light sensors.

Devices such as cellular telephones are sometimes provided with sensors. Light-based proximity sensors can be used to detect whether or not an external object is in the vicinity of a device. Temperature sensors can be used to monitor the temperature of a device's environment. Ambient light sensors may measure visible light in the surroundings of a device.

Using sensors such as these, a cellular telephone can monitor its surroundings and take suitable actions. For example, operation of electrical components in a device such as display components can be controlled based on sensor readings.

It can be challenging to provide an electronic device with sensors. Space constraints and performance issues may be concerns. If care is not taken, a device may not be able to accurately discriminate between different types of operating scenarios or may contain undesirably complex and bulky sensor components.

It would therefore be desirable to be able to provide improved sensor configurations for electronic devices.

SUMMARY

An electronic device may be provided with proximity sensor capabilities for monitoring for the presence of nearby external objects. Proximity sensor data may be used to control the operation of components in the electronic device. For example, operation of a touch sensor array in a display may be inhibited in response to determining that a user's head is resting against the surface of the display.

The electronic device may also make temperature measurements. For example, the electronic device may monitor nearby objects for emitted blackbody light indicative of whether or not the external object is a heat-emitting object such as a human body part. By gathering temperature information in addition to proximity sensor information, the electronic device may be able to discriminate between situations in which an inanimate object that does not emit heat is in the vicinity of the electronic device and situations in which a human body part that is emitting heat is in the vicinity of the electronic device.

To save space and reduce the number of components in a device, the same sensor that is used in gathering temperature readings may be used in gathering proximity sensor data. A device may also be provided with separate temperature sensor and proximity sensor detector structures. Light sources for emitting light at the longer wavelengths that are associated with heat measurements such as wavelengths longer than 3 microns can be formed using semiconductor devices or microelectromechanical systems devices (as examples).

The electronic device may include a motion sensor formed from light sensor structures having an array of heat sensing elements. Signals from the heat sensing elements may also be used in making discrete temperature measurements and in gathering proximity sensor readings.

Further features of the invention, its nature and various advantages will be more apparent from the accompanying drawings and the following detailed description of the preferred embodiments.

DETAILED DESCRIPTION

An electronic device may be provided with electronic components such as sensors. The sensors may include, for example, proximity sensors, ambient light sensors, temperature sensors, and motion sensors. To conserve resources, it may be desirable to perform multiple sensing functions using shared resources.

As an example, a proximity sensor may be formed using a modulated light source that emits light at an infrared wavelength of longer than 3 microns. The proximity sensor may have a corresponding light detector that detects reflected modulated light at a wavelength longer than 3 microns. Control circuitry can demodulate the detected signals to produce proximity sensor data. When it is desired to make temperature measurements, the light detector may make temperature measurements from received light signals (i.e., signals other than demodulated reflected infrared signals associated with the proximity sensor light source).

As another example, a motion detector may be formed from an array of infrared detectors. The array of infrared detectors may be used as a detector of reflected modulated light in a light-based proximity sensor or may be used as a temperature sensor.

Using sensors that measure the temperature of external objects such as a user's head, that measure the proximity of nearby objects, that measure ambient light levels, and/or that measure motion in objects such as a user's hand, control circuitry can control the operation of an electronic device. For example, the functionality of the electronic device may be controlled based on how far the electronic device is located from external objects such as a user's head. When the electronic device is not in the vicinity of the user's head, for example, the electronic device can be operated in a normal mode in which a touch screen display is enabled. In response to detection of the presence of the electronic device in the vicinity of the user's head, the electronic device may be operated in a mode in which the touch screen is disabled or other appropriate actions are taken. Disabling touch sensing capabilities from the electronic device when the electronic device is near the user's head may help avoid inadvertent touch input as the touch sensor comes into contact with the user's ear and hair. Disabling display functions in the touch screen display when the electronic device is near the user's head may help conserve power and reduce user confusion about the status of the display.

Figure 1:
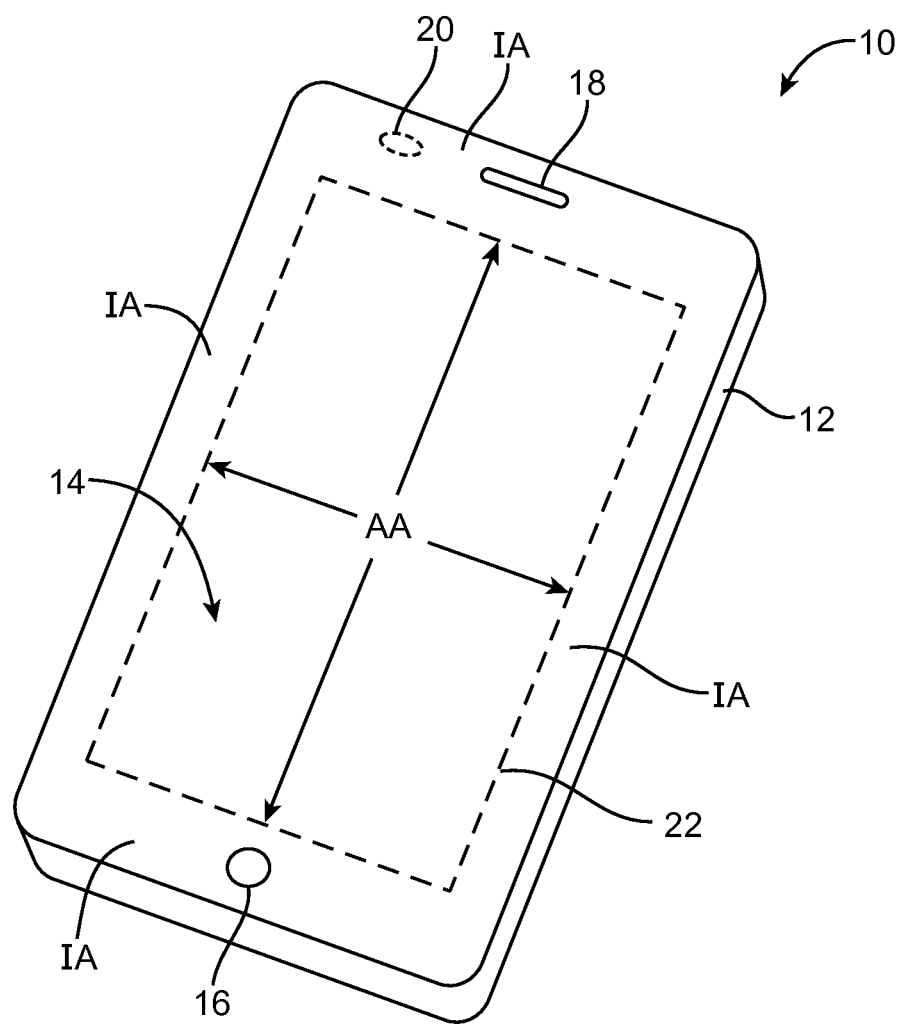
FIG. 1 is a perspective view of an illustrative electronic device of the type that may be provided with sensors in accordance with an embodiment of the present invention.

An illustrative electronic device that may be provided with sensors is shown in FIG. 1. Electronic devices such as device 10 of FIG. 1 may be cellular telephones, media players, other handheld portable devices, somewhat smaller portable devices such as wrist-watch devices, pendant devices, or other wearable or miniature devices, gaming equipment, tablet computers, notebook computers, desktop computers, televisions, computer monitors, computers integrated into computer displays, or other electronic equipment.

As shown in the example of FIG. 1, device 10 may include a display such as display 14. Display 14 may be mounted in a housing such as housing 12. Housing 12 may have upper and lower portions joined by a hinge (e.g., in a laptop computer) or may form a structure without a hinge, as shown in FIG. 1. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. The brightness of display 14 may be adjustable. For example, display 14 may include a backlight unit formed from a light source such as a lamp or light-emitting diodes that can be used to increase or decrease display backlight levels (e.g., to increase or decrease the brightness of the image produced by display pixels) and thereby adjust display brightness. Display 14 may also include organic light-emitting diode pixels or other pixels with adjustable intensities. In this type of display, display brightness can be adjusted by adjusting the intensities of drive signals used to control individual display pixels.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18.

In the center of display 14 (e.g., in the portion of display 14 within rectangular region 22 of FIG. 1), display 14 may contain an array of active display pixels. Region 22 may therefore sometimes be referred to as active area AA of display 14. The rectangular ring-shaped region that surrounds the periphery of active display region 22 may not contain any active display pixels and may therefore sometimes be referred to as inactive area IA of display 14.

The display cover layer or other display layers in display 14 may be provided with an opaque masking layer in the inactive region to hide internal components from view by a user. Windows such as illustrative window 20 may be formed in the opaque masking layer to accommodate light-based components. The windows may be free of opaque masking material so that light of all wavelengths may pass or may be covered with an ink or other material that is opaque in one part of the light spectrum while being transparent in another part of the light spectrum. For example, a window such as window 20 may be provided in an opaque masking layer that is formed from black ink or other material that is opaque in infrared and visible portions of the light spectrum. This window may be filled with an ink or other material that is transparent to infrared light but that is sufficiently opaque to visible light to block internal component in device 10 from view by a user.

Figure 2:
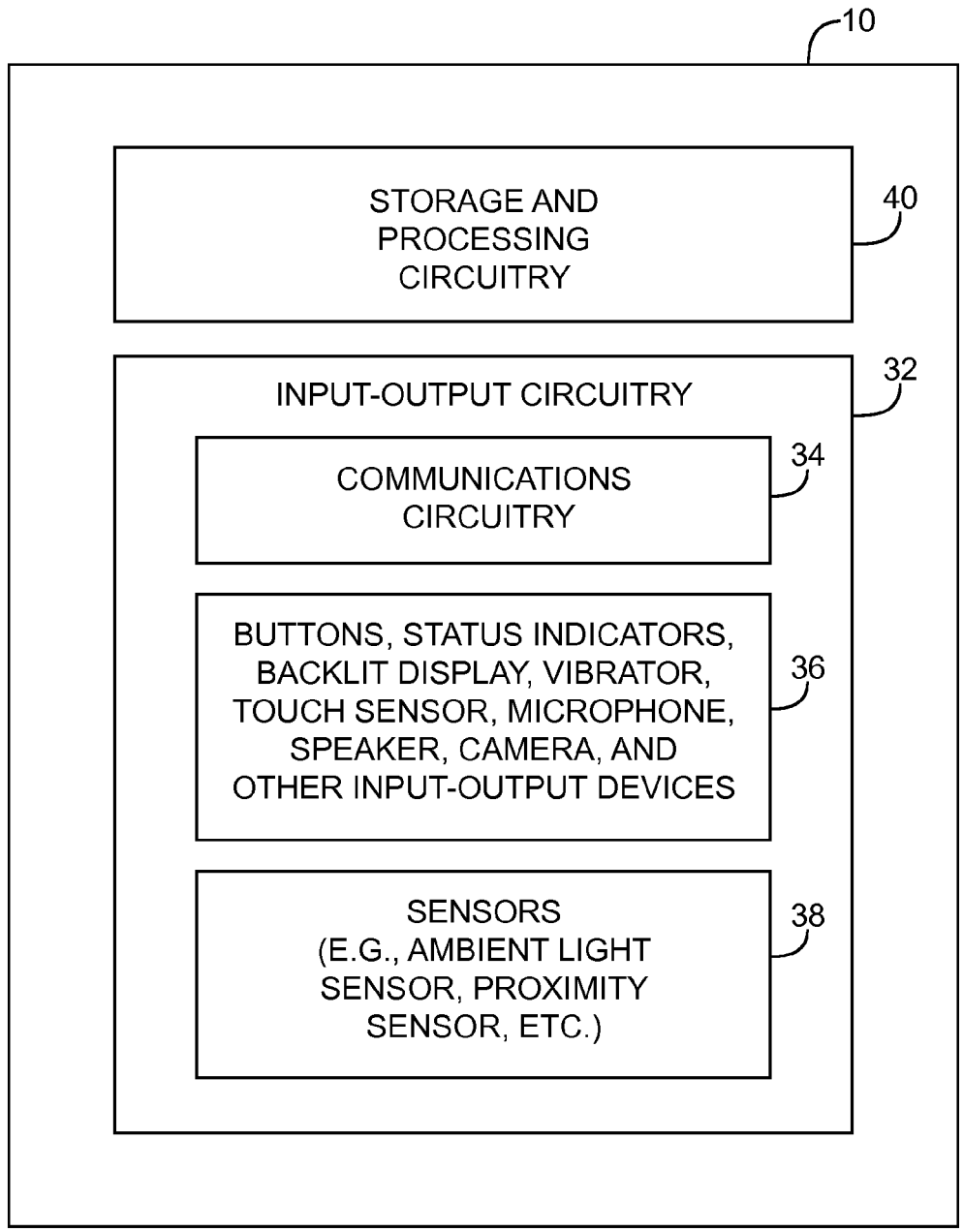
FIG. 2 is a schematic diagram of an illustrative electronic device with sensor circuitry in accordance with an embodiment of the present invention.

A schematic diagram of device 10 showing how device 10 may include sensors and other components is shown in FIG. 2. As shown in FIG. 2, electronic device 10 may include control circuitry such as storage and processing circuitry 40. Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of device 10. The processing circuitry may be based on a processor such as a microprocessor and other suitable integrated circuits. With one suitable arrangement, storage and processing circuitry 40 may be used to run software on device 10 such as internet browsing applications, email applications, media playback applications, operating system functions, software for capturing and processing images, software implementing functions associated with gathering and processing sensor data, software that makes adjustments to display brightness and touch sensor functionality, etc.

Input-output circuitry 32 may be used to allow data to be supplied to device 10 and to allow data to be provided from device 10 to external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Input-output circuitry 32 may include input-output devices 36 such as button 16 of FIG. 1, joysticks, click wheels, scrolling wheels, a touch screen such as display 14 of FIG. 1, other touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, and other equipment for gathering input from a user or other external source and/or generating output for a user.

Sensor circuitry such as sensors 38 of FIG. 2 may include an ambient light sensor for gathering information on ambient light levels. Ambient light sensor circuitry may include one or more semiconductor detectors (e.g., silicon-based detectors) or other light detection circuitry. Sensors 38 may also include proximity sensor components. Sensors 38 may, for example, include a light source for generating a modulated light signal and a light detector for measuring how much of the modulated light from the light source is reflected from nearby objects.

Sensors 38 may include temperature-sensitive structures such as single-element or multi-element infrared detectors. An infrared detector such as a detector that senses light at wavelengths longer than 3 microns may be used to perform proximity sensor light detection functions and temperature sensor functions. A multi-element infrared detector (e.g., an infrared detector array that is configured to measure light at wavelengths longer than 3 microns) may serve as a motion sensor. Detector structures within an infrared detector array may be used as part of a temperature sensor or a proximity sensor (e.g., in scenarios in which the infrared detector array is configured to measure light at infrared wavelengths longer than about 3 microns).

Figure 3:
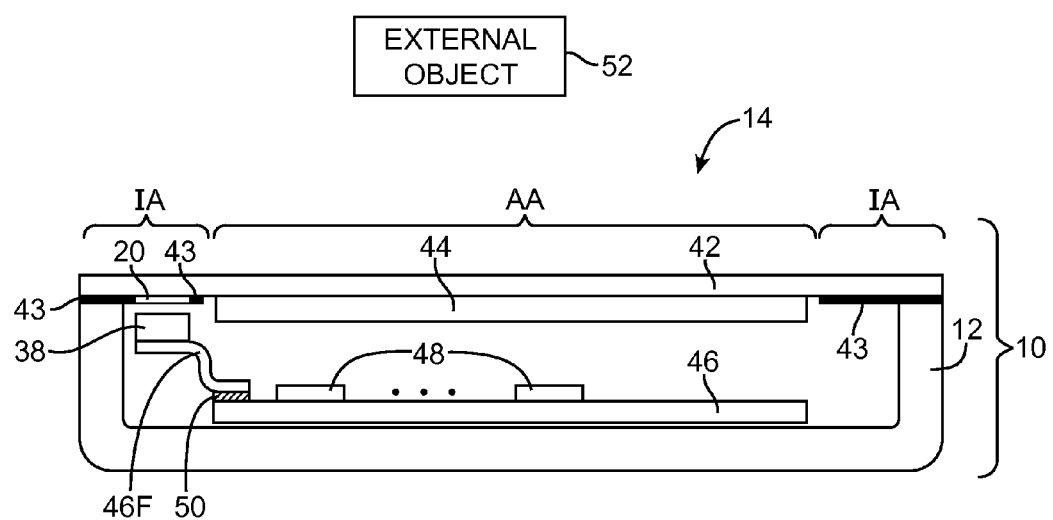
FIG. 3 is a cross-sectional side view of an electronic device showing how sensor structures may be mounted under a portion of a display such as a display cover layer in accordance with an embodiment of the present invention.

A cross-sectional side view of electronic device 10 is shown in FIG. 3. As shown in FIG. 3, display 14 may be mounted in housing 12. Display structures 44 such as a liquid crystal display module, an organic light-emitting diode display layer, or other display structures that include an array of active display pixels may be formed under active area AA of display cover layer 42. Display cover layer 42 may be formed from a clear glass layer, a layer of transparent plastic, or other cover layer material. A layer of ink (e.g., black ink or white ink or ink of other colors) such as opaque masking layer 43 may be formed on the underside of display cover layer 42 in inactive area IA.

One or more sensor windows such as sensor window 20 may be formed in opaque masking layer 43. Sensor window 20 may be devoid of opaque masking material or may be filled with a layer of material that is transparent at some wavelengths (e.g., infrared wavelengths) while being opaque at other wavelengths (e.g., visible wavelengths).

Sensor structures 38 such as light sources, light detectors, and other structures may be mounted under opaque masking material 43 in alignment with windows such as window 20. Communications paths such as metal lines on dielectric substrates may be used in interconnecting sensor structures 38 with processing circuitry in device 10. As an example, sensors 38 may be mounted on a substrate such as substrate 46F. Substrate 46F may be coupled to additional substrates in device 10 such as illustrative substrate 46 using connectors such as connector 50 (e.g., a board-to-board connector or other connection structures).

Device 10 may have electrical components such as components 48. Components 48 may include integrated circuits, buttons, connectors, sensors, and other circuitry of the type shown in FIG. 2. Components 48 may be mounted on one or more substrates such as substrate 46 and/or substrate 46F. Substrates 46 and 46F may be dielectric carriers such as molded plastic carriers or may be printed circuits. For example, substrates 46 and 46F may be printed circuits such as rigid printed circuit boards formed from a material such as fiberglass-filled epoxy or flexible printed circuits formed from sheets of polyimide or other flexible polymer layers.

During operation of device 10, external objects such as external object 52 may be placed in the vicinity of device 10. External object 52 may be a human body part. For example, in a scenario in which a user is placing device 10 in the vicinity of the user's head (e.g., within 5 cm, within 3 cm, or within other distances, external object 52 may be an ear on the side of the user's head. External object 52 may also be a human body part such as a finger or hand of a user (e.g., in a configuration in which a user is making a hand motion in the vicinity of device 10 to supply a command to device 10).

Sensors 38 may monitor the external object. For example, a proximity sensor may detect whether or not the external object is present in the vicinity of device 10 (e.g., within a given distance of sensors 38). Device 10 may, for example, determine whether device 10 is being held against the ear of a user. As another example, sensors 38 may include a detector array that senses heat and motion associated with external object 52. This may allow sensors 38 to track movement of a user's hand during a hand gesture command.

Sensors 38 may operate using light. The light that is used in operating sensors 38 may be ultraviolet light, visible light, and/or infrared light. Infrared light for sensors 38 may be light at wavelengths longer than 3 microns such as near infrared light (e.g., light with a wavelength shorter than about 5 microns such as light at wavelengths of 3-5 microns) or mid-infrared light (e.g., light with a wavelength of 5 microns to about 25-40 microns). Sensor configurations that are based at least partly on infrared light such as light at wavelengths longer than 3 microns and/or mid-infrared light can be used to gather temperature information as well as proximity and/or motion information and are sometimes described herein as an example.

Air contains water vapor that tends to absorb infrared light. There are windows in the water vapor absorption spectrum at 3-5 microns and 8-14 microns in wavelength. In these wavelength ranges, light for sensors 38 is able to propagate through air without excessive absorption by water vapor.

Figure 4:
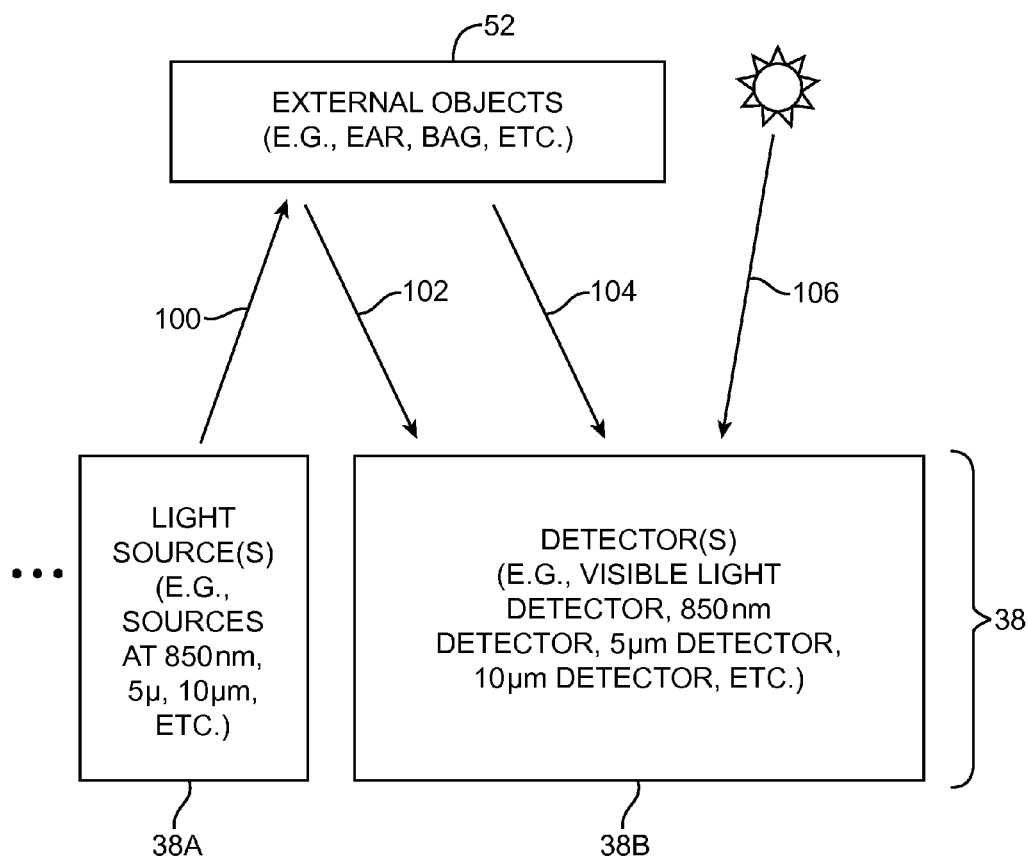
FIG. 4 is a diagram showing how sensor structures such as light sources and light detectors may be used in monitoring external objects and ambient light in accordance with an embodiment of the present invention.

As shown in FIG. 4, sensor structures 38 may contain one or more light sources such as light source(s) 38A and one or more detectors such as light detector(s) 38B. Light sources 38A may include lasers, lamps, microelectromechanical systems (MEMS) light sources (sometimes referred to as MEMS light bulbs), parametric oscillators, light-emitting diodes, or other light sources. For example, light sources 38A may include a light-emitting diode or laser diode formed from gallium arsenide that operates at a wavelength of 850 nm, may be an InAsSbP light-emitting diode or laser that operates at a wavelength of about 3-4 microns (as an example), may be an optical parametric oscillator based on semiconductor such as CdSe that emits light at a wavelength of about 10 microns, or may be a MEMS light source (MEMS light bulb) that emits light at a wavelength of about 10-15 microns. Light-emitting diodes and lasers may be formed from gallium arsenide, InAsSbP, CdSe or other semiconductors.

Light detectors 38B may include silicon detectors for detecting 850 nm light and other infrared light, light detectors based on HgTe or CdTe for detecting 10 micron light, detectors using other semiconductor materials, heat sensing structures such as bolometers (e.g., single-element bolometers or microbolometer arrays), or other infrared light detectors.

When used as part of a light-based proximity sensor, control circuitry 40 may modulate one or more of light sources 38A and may monitor one or more of light detectors 38B. Detected signals from detectors 38B may be demodulated (e.g., using the same type of modulation scheme used in modulating light 100). The process of modulating light 100 from light source 38A may help control circuitry 40 discriminate between light 102 (which is reflected modulated light from external object 52 that is indicative of whether or not external object 52 is in the vicinity of sensors 38B) and other light received by detectors 38B.

Particularly at longer wavelengths (e.g., wavelengths of 3-15 microns), infrared light is associated with heat. By monitoring for the presence of wavelengths from 3-5 microns and/or 10-15 microns or other suitable wavelengths using detectors 38B, detectors 38B can make temperature measurements on external object 52. As shown in FIG. 4, for example, external object 52 may emit blackbody radiation in the form of infrared light 104 (e.g., light from 3-15 microns in wavelength or other heat wavelengths). The temperature of object 52 can be measured by detecting blackbody light 104. Light 100 and reflected light 102 may be infrared light in a different wavelength range than light 104 or light 100, 102, and 104 may include light at the same wavelengths. Light sources such as sun 108 produce ambient light 106. If desired, detectors 38B may be used in monitoring ambient light 106 (e.g., in the visible portion of the spectrum).

At longer wavelengths (e.g., wavelengths from 3-15 microns, the emissivity of objects at room temperature such as object 52 of FIG. 4 tends to grow relative to other sources of light such as ambient light source 108. This allows detectors 38B to measure the temperature of external objects using light 104. Temperature measurements may be used to help discriminated between the presence of a user's ear (or other body part) and the presence of inanimate (colder) objects. Device 10 is able to take appropriate action in response to detection of external objects 52 when device 10 is able to accurately ascertain the identity of external objects 52 using temperature measurements in addition to or instead of using proximity sensor measurements that do not reveal information on the temperature of the external objects.

To reduce the amount of circuitry within device 10, it may be desirable to consolidate multiple light processing functions within a device. Consider, as an example, a scenario in which light source 38A is formed from a MEMS light source (i.e., a MEMS light bulb) that emits light 100 at a wavelength of 10-15 microns. Detector 38B may be a bolometer that detects light at a wavelength range of 10-15 microns. Control circuitry 40 may modulate the MEMS light source at a frequency of about 10-100 Hz (as an example). When external object 52 is present in the vicinity of device 10, modulated light 100 will reflect from object 52 as shown by reflected light 102 of FIG. 4. Control circuitry may use information on the modulation scheme being used to transmit light 100 to accurately demodulate the reflected light and thereby measure how much reflected light 102 is being received at sensors 38B.

When it is desired to gather temperature information, control circuitry 40 may turn off light source 38A to stop the production of modulated light 100 and reflected modulated light 102 or may filter out detected modulated light signals. In this way, detector 38B (i.e., the bolometer in this example) may detect blackbody light 104 and may use this information to determine the temperature of external object 52. The detected blackbody light (light 104) is preferably distinguishable from ambient light 106 due to the relatively long wavelength of light 104 (e.g., 3-15 microns) that is emitted from external object 52.

Figure 5:
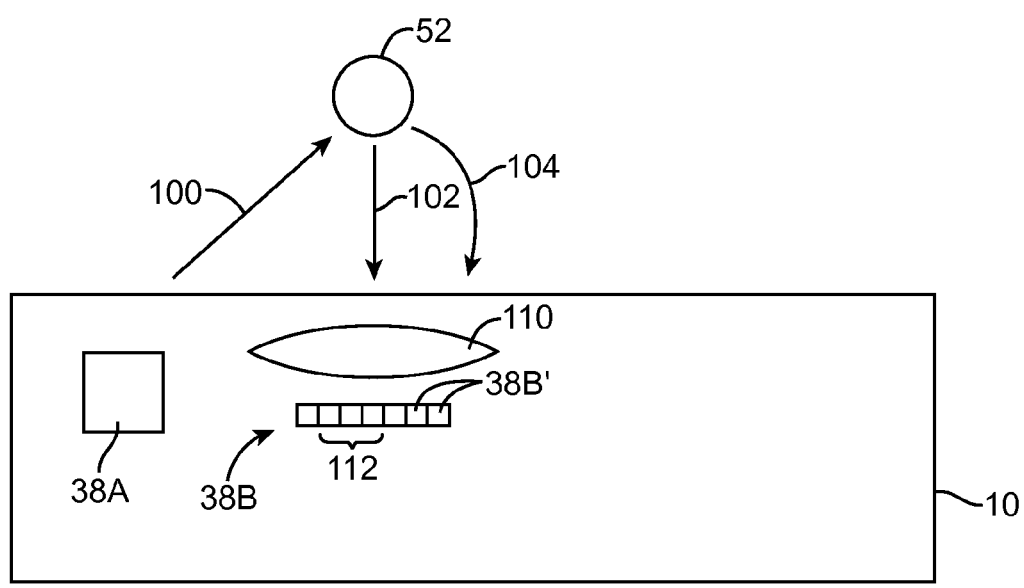
FIG. 5 is a cross-sectional side view of a portion of an electronic device having a multi-element detector of the type that may be used for motion sensing and other sensing functions in accordance with an embodiment of the present invention.

If desired, detector 38B may be an infrared sensor array (e.g., a bolometer formed from a grid of heat sensor elements such as detector 38B of FIG. 5, which has a one-dimensional or two-dimensional array of heat sensing elements 38B'). Lens 110 may be formed from one or more individual lenses. To ensure that heat measurements can be made using sensor 38B, lens 110 may be formed from a material that is transparent to infrared light with a wavelength of 3-15 microns such as silicon.

Control circuitry 40 may modulate light source 38A to form modulated light 100. Light source 38A may, for example, be a MEMS light bulb that produces modulated light 100. Reflected modulated light 102 may be detected by all of sensor elements 38B' of sensor 38B or may be detected using a subset of sensor elements (heat-sensing elements) such as subset 112 of sensor elements 38B' (e.g., a single one of sensor elements 38B' or a group of multiple elements 38B'). This allows light source 38A and light detector 38B of FIG. 5 to serve as a light-based proximity sensor using light 102 from light source 38A.

Blackbody light 104 may also be detected by one or more of sensor elements 38B' (i.e., sensor 38B of FIG. 5 may serve as a temperature sensor).

When multiple heat sensor elements 38B' of sensor 38B are available to control circuitry 40, sensor 38B may used in detecting motion in object 52 relative to device 10. Sensor 38B may, for example, detect motion of object 52 when object 52 is a user's hand being used to supply device 10 with a hand gesture command (as an example).

The light source and detector structures of FIG. 5 may therefore be used in light-based proximity functions (e.g., by modulating light source 38A and demodulating corresponding received light 102 from detector 38B), in making temperature measurements from external light 104 (e.g., using subset 112 of heat sensing elements 38B' in detector 38), and/or in making motion detector measurements (e.g., using the array of elements 38B' in detector 38B. It is not necessary to provide numerous separate light sensing structures in device 10.

If desired, light source 38A of FIG. 5 may be a light source operating at 3-5 microns or 10-15 microns, an InAsSbP light-emitting diode or laser operating in a wavelength range of 3-5 microns, a parametric oscillator operating at 10 microns, a MEMs light source, or other light source, and light detector 38B may be a detector that is sensitive to light at 3-5 microns such as a photodetector formed from the InAsSb/InAsSbP materials system, a bolometer, a light detector that is sensitive to light in a wavelength range of 10-15 microns, a detector that is sensitive to light at 10 microns such as a solid state HgTe or CdTe detector, a detector array, or other infrared light sensor.

Figure 6:
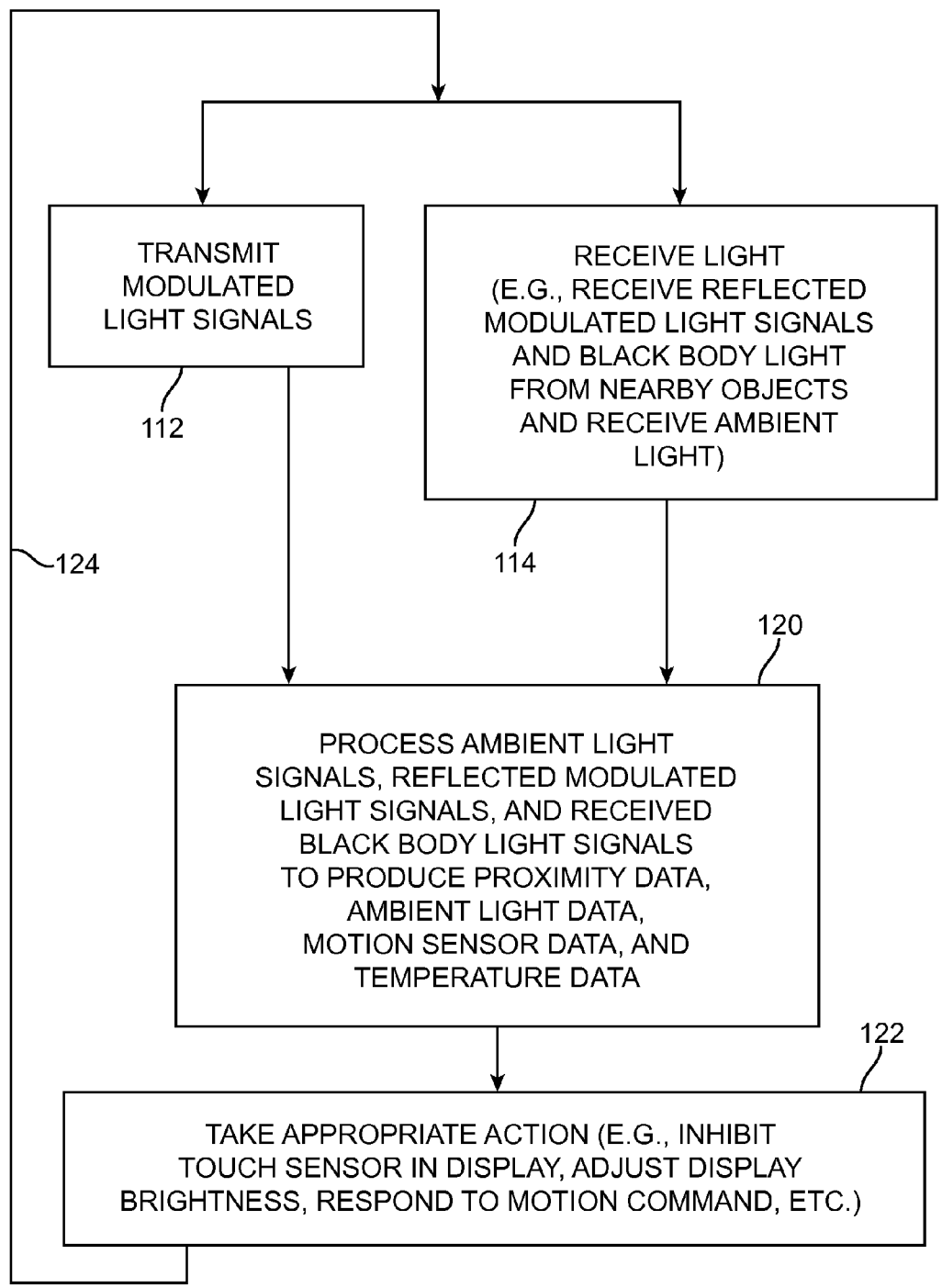
FIG. 6 is a flow chart of illustrative steps involved in using an electronic device with sensor circuitry in accordance with an embodiment of the present invention.

Illustrative steps involved in using information from sensor structures 38 in operating device 10 are shown in FIG. 6.

At step 112, one or more light sources 38A may, if desired, transmit light 100. One or more light sources 38A may be included in structures 38. For example, structures 38 may include semiconductor laser structures, semiconductor light-emitting diode structures, MEMs light sources (i.e., MEMs "light bulbs"), parametric oscillators, lamps, light sources that operate at near infrared wavelengths such as 850 nm, light sources that operate at near infrared and mid-infrared wavelengths such as at 3-5 microns and 10-15 microns, light sources that produce visible light in addition to or instead of producing infrared light, or light sources that produce other types of light.

Transmitted light 100 may be reflected from nearby objects such as external object 52 as reflected light 102. When object 52 is not present in the vicinity of device 10, light 100 will propagate in free space without being reflected back towards device 10 and sensor structures 38. As a result, device 10 will not detect reflected light 102 and can conclude that external object 52 is not in the vicinity of device 10 (i.e., object 52 is more than 10 cm or other distance from device 10). When object 52 is present, reflected light 102 can be detected by detector 38B.

To ensure that control circuitry 40 can satisfactorily discriminate reflected proximity sensor light 102 from other sources of light, it may be desirable to modulate light 100 during the light transmission operations of step 112. Light 100 may be modulated using a sine wave modulation scheme, using square wave modulation, using a pseudorandom modulation code or other binary modulation pattern, or using any other suitable modulation technique. The bandwidth of light source 38A and therefore the ability of light source 38A to be modulated at a desired frequency may be dictated by the type of structures that are used in implementing light source 38A. As an example, semiconductor structures such as laser and light-emitting diode structures may be modulated at relatively higher frequencies (e.g., 1-1000 kHz or more) whereas lamps and MEMs light sources may have bandwidths that dictate use of modulation frequencies of 10-100 Hz (as an example).

During the operations of step 114, device 10 may use detector structures to detect incoming light in the vicinity of device 10. Control circuitry 40 may process the light that is detected during the operations of step 114 at step 120 and may take appropriate action based on the detected light signals at step 122. Processing may then loop back to steps 112 and 114, as indicated by line 124

Device 10 may include one or more light detectors 38B for detecting light during the operations of step 114. For example, device 10 may contain a near infrared transmitter 38A such as a light-emitting diode that emits light 100 at 850 nm (as part of the operations of step 112) and may have a corresponding near infrared detector 38B that is configured to detect reflected modulated infrared light 102 at 850 nm (as part of the operations of step 114). The 850 nm light source and 850 nm detector in this type of scenario serve as a proximity sensor. The 850 nm optical detector may have optical filtering structures that block visible light and that block infrared light at wavelengths other than 850 nm. The optical filtering structures may enhance the signal-to-noise ratio of received 850 nm signals, so that accurate proximity data is produced. The 850 nm transmitter may be modulated and control circuitry 40 may demodulate detected signals for reflected light 102 as part of the processing operations of step 120.

In configurations in which device 10 is provided with an 850 nm proximity sensor of this type, detector structures 38B are preferably provided with at least one longer-wavelength detector such as a detector operating at a wavelength longer than 3 microns (e.g., wavelengths of 3-5 microns or at 10-15 microns) so that temperature measurements may be made at step 114. In particular, control circuitry 40 may use a detector operating at wavelengths longer than 3 microns such as wavelengths of 3-5 microns or 10-15 microns to measure heat (blackbody light 104) from nearby objects such as external object 52. During the operations of step 120, control circuitry 40 can process the 850 nm proximity sensor signals and heat signals. By comparing proximity sensor signals associated with an 850 nm proximity sensor and heat measurements, control circuitry 40 can discriminated between nearby inanimate objects that produce relatively small amounts of heat and animate objects such as an ear, hand, or other body parts that tend to emit detectable amounts of heat (blackbody light 104). Ambient light 106 can be detected using a separate visible light ambient light detector. Ambient light 106 that is incident on the heat detector (i.e., the sensor 38B that is sensitive to light with a wavelength longer than 3 microns such as light at wavelengths of 3-5 microns or 10-15 microns) will generally produce small (e.g., negligible) amounts of detected signal compared to nearby heat-emitting objects such as human body parts.

In another illustrative embodiment, light sensors 38B contain an ambient light detector such as a visible light detector for detecting ambient light 106 and contain a detector 38B that is sensitive to light at wavelengths longer than 3 microns such as wavelengths of 3-5 microns or 10-15 microns, but do not necessarily contain a separate proximity sensor detector operating at 850 nm. In this situation, detector 38B can be use to make heat measurements (measurements of blackbody light 104) as well as proximity sensor measurements using modulated light at a wavelength of longer than 3 microns (e.g., wavelengths of 3-5 microns or 10-15 microns). During the operations of step 112, control circuitry 40 can modulate a transmitter 38A that is operating at a wavelength of 3-5 microns or 10-15 microns or other wavelengths greater than 3 microns. When external object 52 is in the vicinity of device 10, the modulated light 100 that is transmitted from transmitter 38A will be reflected from object 52 as light 102. Detector 38B (i.e., sensor structures that are responsive to light at wavelengths of 3-5 microns or 10-15 microns or other wavelengths longer than 3 microns) will detect reflected modulated light 102 and blackbody light 104. Reflected signals 102 can be extracted from the total detected signals from sensor structures 38B by using control circuitry 40 to perform signal demodulation operations during step 120 (e.g., using a demodulation scheme corresponding to the modulation scheme used in transmitting modulated light 100). This allows control circuitry 120 to discriminate between proximity sensor signals (i.e., reflected light signals 102 that are modulated when transmitted during step 112) and blackbody light 104, which is emitted by nearby objects such as human body parts that give off heat. Ambient light 106 contains relatively small amounts of light at wavelengths of 3-5 and 10-15 microns and can therefore be ignored when processing the signals from the sensor structures 38B that are sensitive to light at wavelengths of 3-5 microns, 10-15 microns, or other wavelengths longer than 3 microns.

As described in connection with FIG. 5, sensors such as sensor 38B of FIG. 5 may be provided with multiple sensing elements 38B'. Each sensing element 38B' may, for example, be sensitive to light at a wavelength of 3-5 microns or 10-15 microns. During the operations of step 114, sensor 38B can gather data from all elements 38B' and/or from a subset of elements 38B'. During the operations of step 120, the gathered data can be processed to discriminate between proximity sensor data (i.e., modulated light 102) and blackbody light 104 such as light from a human body part or other external object 52 that emits heat. If desired, a subset of one or more of sensor elements 38B' may be used to as a detector for detecting proximity sensor (modulated light 102) and/or blackbody light 104. Because sensor 38B contains an array of elements 38B' (in this example) control circuitry 40 can capture thermal images of external object 52 and/or can otherwise gather multi-element data of the type that can be used to detect motion in object 52 relative to device 10. When processing sensor data to detect motion, control circuitry 40 preferably uses signals from multiple elements 38B' (e.g., all elements in the sensor array).

Regardless of the particular hardware configuration used for sensor structures 38 of device 10, device 10 may, during the operations of step 120 use data form sensor structures 38 in performing functions such as proximity sensing functions (i.e., determining whether or not external objects 52 are present in the vicinity of device 10), temperature sensing functions (i.e., monitoring infrared light to determine whether a heat-emitting external object is nearby), motion sensing functions (i.e., determining whether a user is providing motion-based gesture input to device 10), and/or ambient light sensing functions.

During the operations of step 122, device 10 can take actions based on the measured and processed data from sensor structures 38. As an example, control circuitry 40 in device 10 may inhibit touch sensor functionality in touch screen display 14 when it is determined that device 10 is in close proximity to the user's head, device 10 may adjust the brightness of display 14 based on ambient light levels, device 10 may respond to a motion-based hand command from the user, etc. As indicated schematically by line 124, the steps of FIG. 6 may be performed continuously during the operation of device 10 (as an example).

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
   a light source operable at wavelengths longer than 3 microns;
   a light detector operable at wavelengths longer than 3 microns;
   control circuitry that modulates the light source to produce modulated light at wavelengths longer than 3 microns that reflects from external objects and is detected by the light detector to produce a proximity sensor signal,
   wherein the light detector comprises an array of multiple heat sensing elements and wherein the control circuitry is configured to detect motion of the external object by processing signals from the multiple heat sensing elements; and
   a silicon lens that gathers light for the light detector.

2. The electronic device defined in claim 1 wherein the external object is a human body part that emits blackbody light and wherein the control circuitry is configured to use the light detector to detect the blackbody light.

3. The electronic device defined in claim 1 wherein the light source comprises a microelectromechanical systems light source.

4. The electronic device defined in claim 3 wherein the light source is configured to emit light at a wavelength of 10-15 microns.

5. The electronic device defined in claim 1 wherein the light source comprises a semiconductor device.

6. The electronic device defined in claim 5 wherein the light source is configured to emit light at a wavelength of 3-5 microns.

7. The electronic device defined in claim 1 wherein the light detector is configured to detect light at a wavelength of 3-5 microns.

8. The electronic device defined in claim 1 wherein the light detector is configured to detect light at a wavelength of 10-15 microns.

9. The electronic device defined in claim 8 wherein the light detector comprises a bolometer.

10. The electronic device defined in claim 1 further comprising a display, wherein the control circuitry is configured to inhibit touch screen functionality in the display based on the proximity sensor signal.

11. The electronic device defined in claim 1, wherein the control circuitry is configured to gather signals from a first subset of the multiple heat sensing elements to make a temperature measurement, and wherein the control circuitry is configured to gather signals from a second subset of the multiple heat sensing elements to make motion detector measurements.

12. An electronic device, comprising:
   a housing;
   a display mounted in the housing;
   a light sensor that is mounted under an inactive area in the display and that is configured to detect light at a wavelength longer than 3 microns; and
   control circuitry configured to measure blackbody light signals at wavelengths longer than 3 microns using the light sensor, wherein the light sensor comprises an array of multiple heat sensing elements and wherein the control circuitry is configured to gather signals from a first subset of the multiple heat sensing elements to make a temperature measurement, and wherein the control circuitry is configured to gather signals from a second subset of the multiple heat sensing elements to make motion detector measurements.

13. The electronic device defined in claim 12 further comprising a sensor window in the inactive area, wherein the light sensor is aligned with the sensor window and receives the light through the sensor window.

14. The electronic device defined in claim 12 further comprising a light-based proximity sensor having a near infrared light source that is modulated by the control circuitry and a corresponding near infrared light detector.

15. The electronic device defined in claim 12 further comprising:
   a visible light ambient light detector; and
   a light source that is modulated by the control circuitry to produce a light signal having a wavelength longer than 3 microns.

16. The electronic device defined in claim 12 wherein the light sensor is configured to measure light at wavelengths of 10-15 microns.

17. The electronic device defined in claim 16 wherein the light sensor comprises a bolometer.

18. A method of monitoring for external objects within the vicinity of an electronic device, comprising:
   modulating a light source in the electronic device to emit modulated light;
   monitoring for reflections of the emitted modulated light using a mid-infrared light detector, wherein the mid-infrared light detector comprises a bolometer having an array of heat sensing elements; and
   detecting motion in the external objects using the array of heat sensing elements, wherein detecting motion in the external objects comprises detecting a hand gesture command from a user's hand using the array of heat sensing elements.

19. The method defined in claim 18 wherein the mid-infrared light detector comprises a light sensor configured to detect signals at a wavelength of 10-15 microns and wherein monitoring for reflections of the emitted modulated light comprises demodulating signals detected with the light detector to produce proximity sensor data.

* * * * *